(12) United States Patent
Hanetseder et al.

(10) Patent No.: US 11,254,012 B2
(45) Date of Patent: Feb. 22, 2022

(54) CONTROL DEVICE AND CONTROL METHOD FOR INDUSTRIAL MACHINES HAVING CONTROLLED MOVEMENT DRIVES

(71) Applicant: KEBA AG, Linz (AT)

(72) Inventors: Markus Hanetseder, Linz (AT); Emanuel Maier, Schleissheim (AT); Roland Schrattbauer, Haibach im Muehlviertel (AT); Heinz Stummer, Voecklabruck (AT); Phillipp Wimmer, Desselbrunn (AT)

(73) Assignee: KEBA AG, Linz (AT)

( * ) Notice: Subject to any disclaimer, the term of this patent is extended or adjusted under 35 U.S.C. 154(b) by 344 days.

(21) Appl. No.: 16/330,492

(22) PCT Filed: Sep. 11, 2017

(86) PCT No.: PCT/AT2017/060222
§ 371 (c)(1),
(2) Date: Mar. 5, 2019

(87) PCT Pub. No.: WO2018/049447
PCT Pub. Date: Mar. 22, 2018

(65) Prior Publication Data
US 2019/0224854 A1     Jul. 25, 2019

(30) Foreign Application Priority Data

Sep. 14, 2016     (AT) ............................... A 50821/2016

(51) Int. Cl.
*B25J 13/02*     (2006.01)
*G05B 19/418*     (2006.01)
(Continued)

(52) U.S. Cl.
CPC .......... *B25J 13/025* (2013.01); *G05B 19/418* (2013.01); *G06F 3/016* (2013.01); *G06F 3/0362* (2013.01);
(Continued)

(58) Field of Classification Search
CPC ........ B25J 13/025; B25J 13/084; B25J 13/06; B25J 9/1664; B25J 9/1666; B25J 9/1674;
(Continued)

(56) References Cited

U.S. PATENT DOCUMENTS 5,944,151 A     8/1999   Jakobs et al.
6,462,499 B2    10/2002  Mukai
(Continued)

FOREIGN PATENT DOCUMENTS

CN     1551041 A     12/2004
CN     1591306 A     3/2005
(Continued)

OTHER PUBLICATIONS

International Search Report in PCT/AT2017/060222, dated Jan. 3, 2018.
(Continued)

*Primary Examiner* — Khoi H Tran
*Assistant Examiner* — Tanner L Cullen
(74) *Attorney, Agent, or Firm* — Collard & Roe, P.C.

(57) ABSTRACT

A control device for industrial machines having controlled motion drives for machine components has at least one control element configured to manually influence or specify adjustment movements of at least one machine component and is implemented as a rotary control element with a continuously rotatable actuating element connected in terms of motion to a rotational resistance generator that is variable under control or the actuating element can be connected in terms of motion thereto. The rotational resistance generator (Continued)

Figure 1:
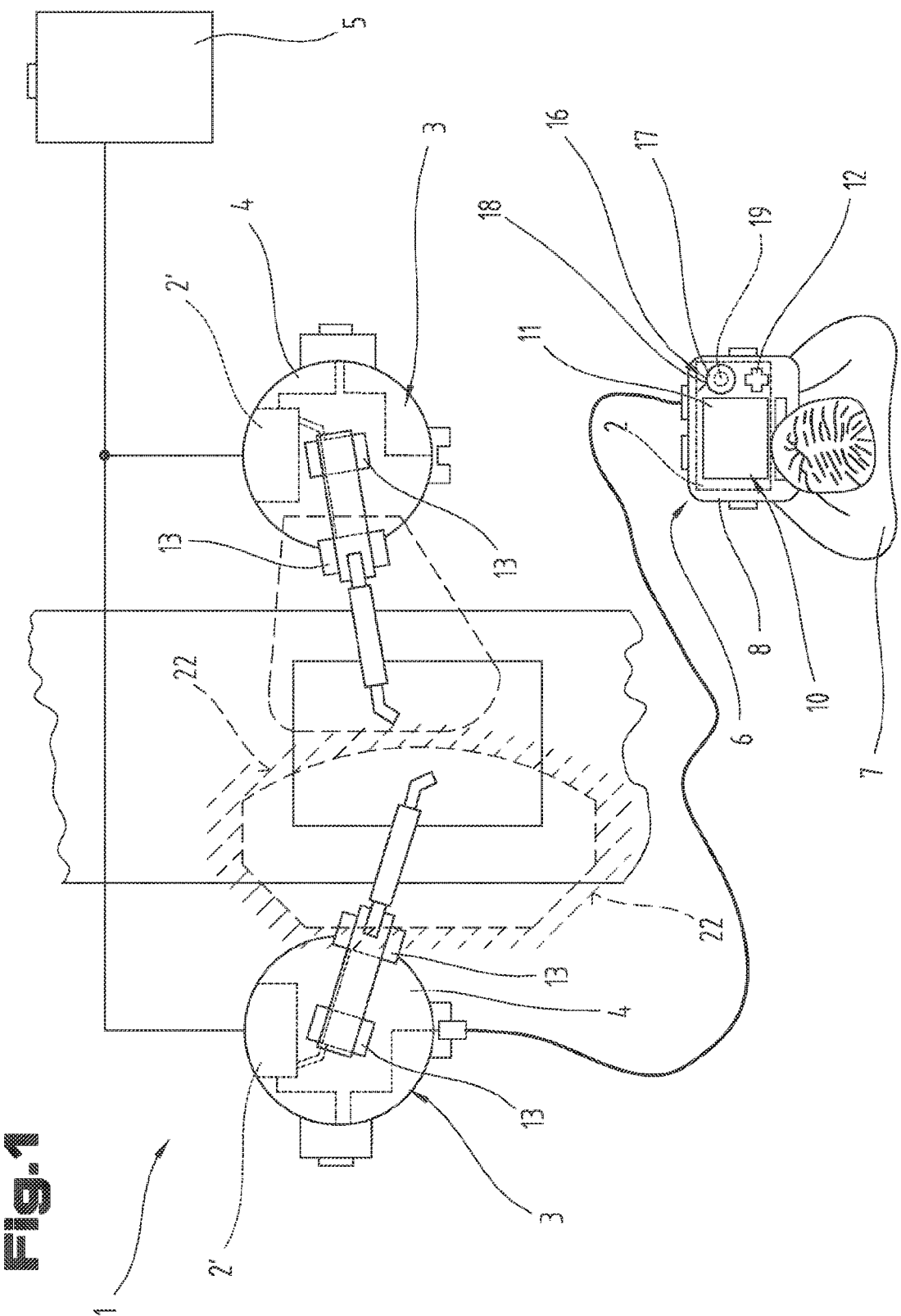

is drivable by an analysis and control device. The analysis and control device and the rotational resistance generator in this case are equipped to inhibit the rotational mobility of the actuating element, or to subject it to an increased rotational resistance haptically perceptible by an operator, as a function of machine states or events known to or sensed by the control device. In addition, a corresponding control method is specified.

21 Claims, 4 Drawing Sheets

(51) Int. Cl.
    *G06F 3/01*     (2006.01)
    *G06F 3/0362*     (2013.01)
    *G05G 5/03*     (2008.04)

(52) U.S. Cl.
    CPC ..... *G05B 2219/35251* (2013.01); *G05G 5/03* (2013.01)

(58) Field of Classification Search
    CPC ......... G05G 5/03; G06F 3/016; G06F 3/0362; G05B 19/418; G05B 19/409; A61B 34/76
    See application file for complete search history.

(56) References Cited

U.S. PATENT DOCUMENTS

| | | |
|---|---|---|
| 7,086,243 B2 | 8/2006 | Sato et al. |
| 7,124,648 B2 | 10/2006 | Shibazaki et al. |
| 9,592,608 B1 * | 3/2017 | Bingham ............. G05B 19/423 |
| 9,925,662 B1 * | 3/2018 | Jules ................... G05B 19/423 |
| 10,081,109 B2 | 9/2018 | Kowalski et al. |
| 2010/0073150 A1 * | 3/2010 | Olson ..................... A61B 34/30 340/407.1 |
| 2011/0102145 A1 | 5/2011 | Park et al. |
| 2013/0248276 A1 * | 9/2013 | Chacko .................. B60T 7/085 180/334 |
| 2013/0345869 A1 * | 12/2013 | Chen ....................... G06F 17/00 700/255 |
| 2014/0288707 A1 * | 9/2014 | Asahi ..................... F16P 3/147 700/253 |
| 2018/0078320 A1 * | 3/2018 | Griffiths ................. A61B 34/30 |
| 2018/0111273 A1 * | 4/2018 | Linnell .................. B25J 13/084 |
| 2019/0054620 A1 * | 2/2019 | Griffiths ................. A61B 34/30 |

FOREIGN PATENT DOCUMENTS

| | | |
|---|---|---|
| CN | 103386687 A | 11/2013 |
| CN | 104908046 A | 9/2015 |
| DE | 195 28 457 A1 | 2/1997 |
| DE | 601 26 855 T2 | 10/2007 |
| DE | 10 2013 109753 A1 | 3/2014 |
| EP | 1 075 979 B1 | 2/2001 |
| EP | 1 403 619 B1 | 3/2004 |
| EP | 1 437 641 A1 | 7/2004 |
| WO | WO-2005029983 A1 * | 4/2005 ............... A24C 5/00 |

OTHER PUBLICATIONS

Chinese Search Report in CN 201780056107.X, dated Aug. 20, 2021, with English translation.

* cited by examiner

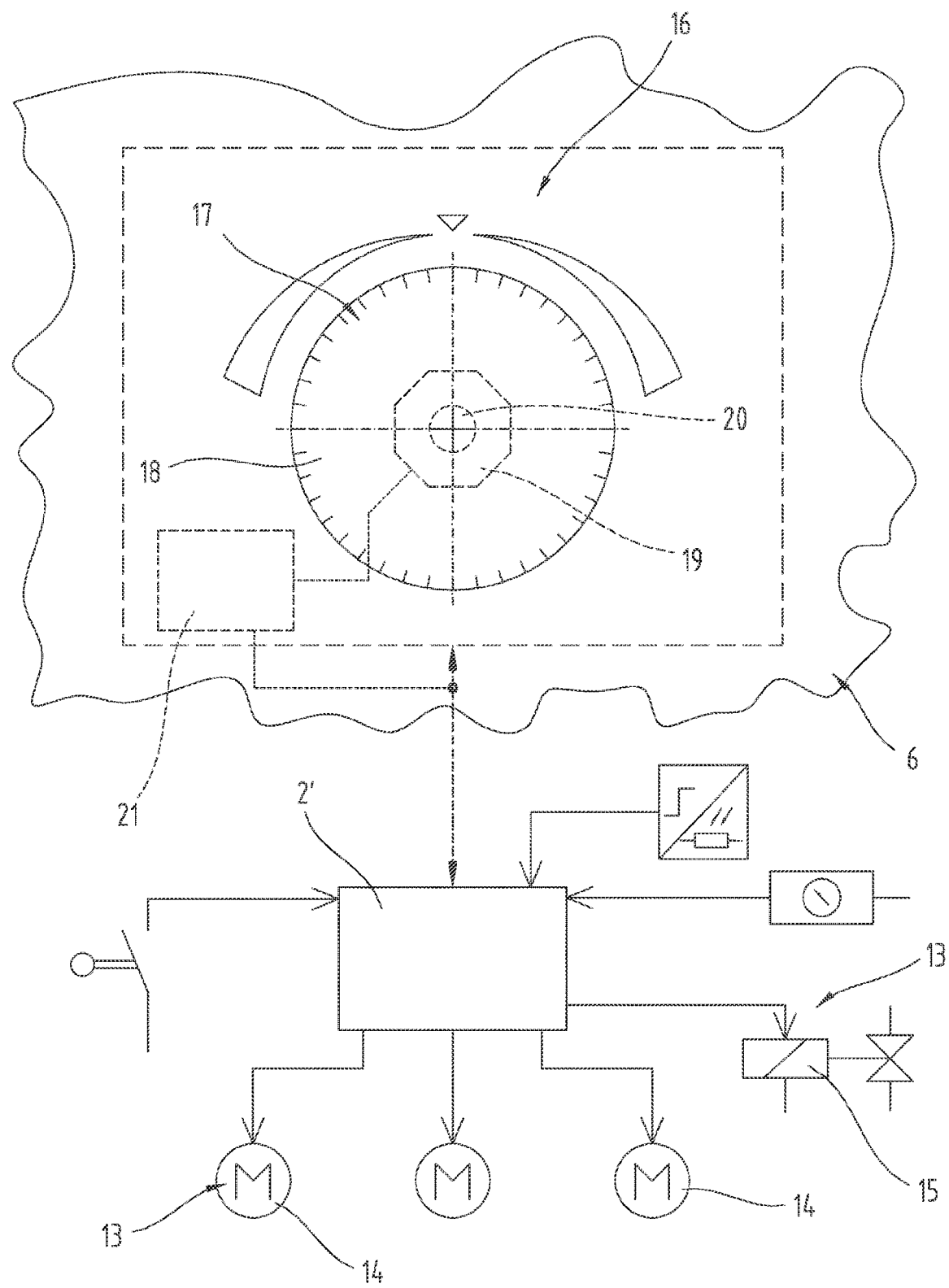

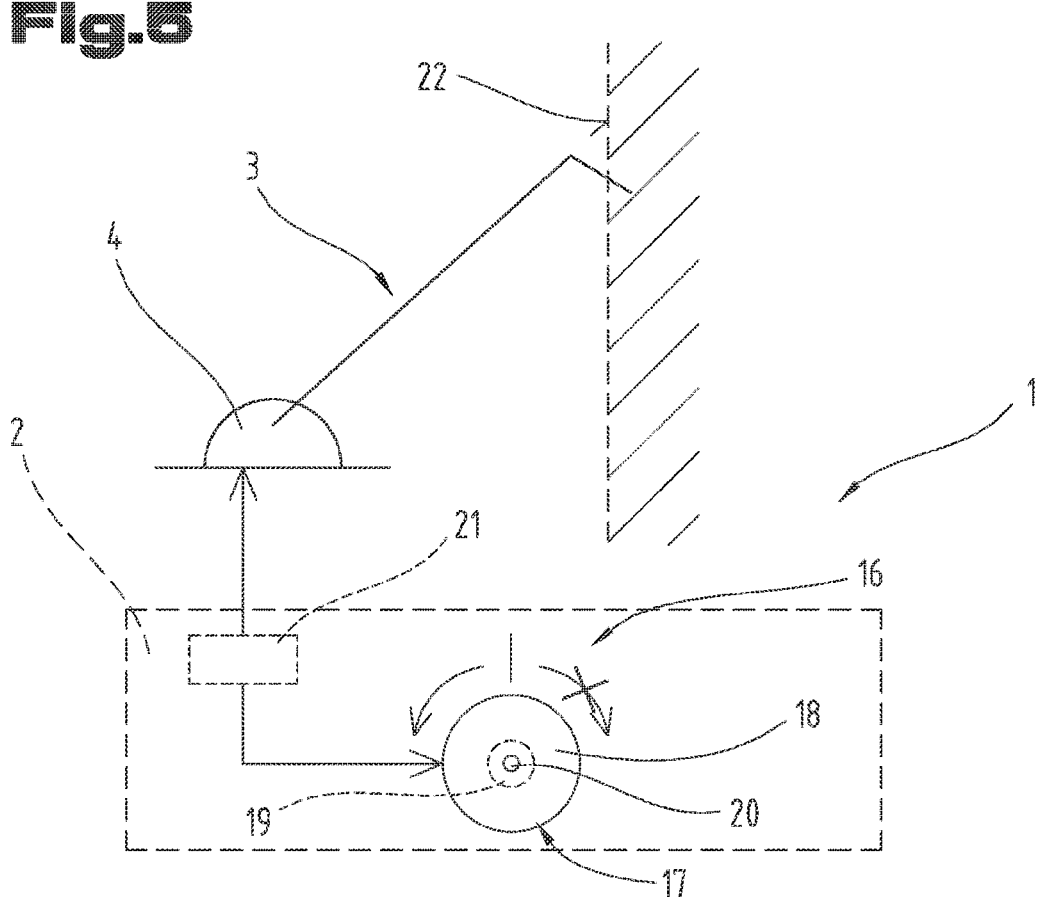
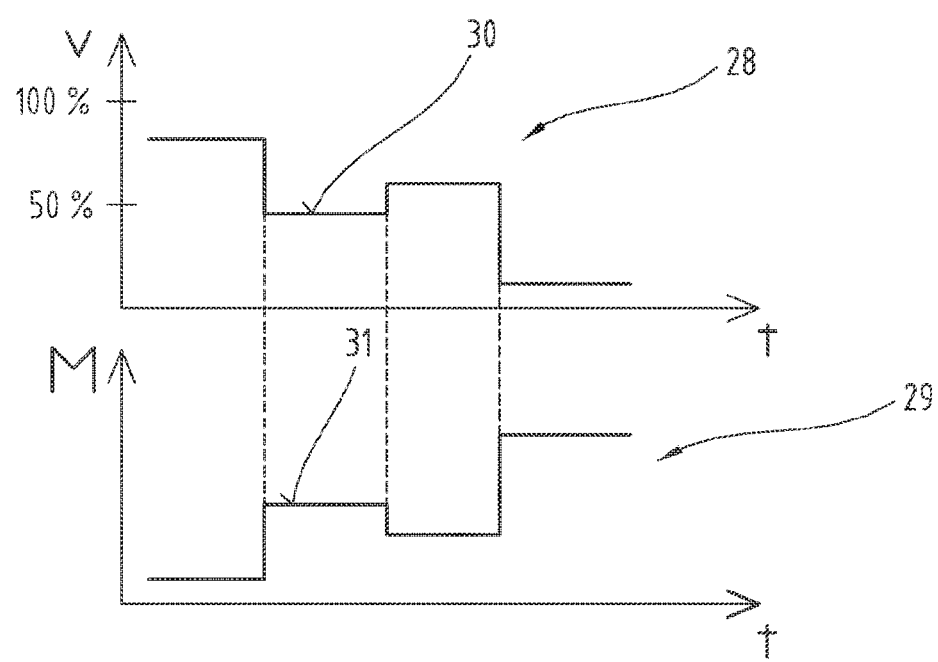

CONTROL DEVICE AND CONTROL METHOD FOR INDUSTRIAL MACHINES HAVING CONTROLLED MOVEMENT DRIVES

CROSS REFERENCE TO RELATED APPLICATIONS

This application is the National Stage of PCT/AT2017/060222 filed on Sep. 11, 2017, which claims priority under 35 U.S.C. § 119 of Austrian Application No. A 50821/2016 filed on Sep. 14, 2016, the disclosure of which is incorporated by reference. The international application under PCT article 21(2) was not published in English.

The invention relates to a control device for industrial machines having controlled motion drives for machine components, in particular for machine axes that are movable under control, and to a method for operating an electronic control device for industrial machines having controlled motion drives, as is specified in claims 1 and 17.

From EP 1 403 619 B1, an electronic operating system is known that is provided as part of a driver information system in motor vehicles. In addition, this operating system is also intended to be able to be used as a display and operating device in connection with the control of machines, for instance in industrial manufacture. This operating system comprises an electronic control unit that has an arithmetic logic unit, a display unit that is suitable for visualization of graphical representations, and a control unit with which manual interventions regarding the functions of the respective system may be undertaken. In order to change parameters of the system, provision is made here that an indicator mark in the manner of a cursor is moved over the display surface of the display unit and an available function is selected by this means. After corresponding selection of the desired function by cursor-like movement of the display mark, another control element is activated in order to be able to change parameters therewith. This second control element allows, for example, a change of parameter values in conjunction with the function previously selected via a first control element. The measures described in this document are only suitable to a limited extent for the control or influencing of machines having motion drives. Instead, the measures described are suitable for use in conjunction with relatively noncritical functions such as occur in driver information systems in motor vehicles. Operation of industrial machines having motion drives using this prior art design would be satisfactory to only a limited extent.

EP 1 075 979 B1 describes a method for operating a multifunction operating device that likewise can be employed advantageously in conjunction with motor vehicles. In this multifunction operating device, menus and/or control functions are displayed on a display unit, and the said menus and/or functions are activated via button elements and at least one rotary actuator element. At least one of these rotary actuator elements in this design is freely programmable with respect to its rotary directions and rotary positions and/or latching positions and/or actuating stops. This free programming is accomplished here in such a manner that haptic feedback that is associated with the menus or functions called up in each case is produced in the rotary actuation path. Associated with each actuation function in this design is a set of haptic data that can be adapted dynamically to a change in function data. In this way, intuitive operation is made possible since the operator is provided with haptic feedback that is automatically adapted as a function of the applicable menus or functions. Operation of industrial machines having motion drives using the specified device is feasible to only a limited extent, however.

The task of the present invention was to overcome the disadvantages of the prior art and to provide a device and a method by means of which a user is able to undertake the most feasible possible operation of industrial machines having motion drives.

In particular, a task of the present invention is to improve the operability or programmability of machines having components that are movable under control or actively adjustable machine axes.

This task is accomplished by a device and a method according to the claims.

Accordingly, a control device for industrial machines having controlled motion drives for machine components is provided, which control device comprises at least one human-machine interface, in particular control-related input and output means. In this design, at least one control element is designed for manual influencing or specification of adjustment movements of at least one of the machine components, for example in the manner of machine axes that are adjustable under control. The corresponding control device is distinguished in that at least one control element is implemented as a rotary control element with an actuating element that is continuously rotary, in particular rotatable without stops, in that the actuating element is in mechanical connection or interaction with a rotational resistance generating means that is variable under control, in that the rotational resistance generating means can be driven by an analysis and control device, and in that the analysis and control device and the rotational resistance generating means are equipped to inhibit the rotational mobility of the actuating element or to subject it to an increased rotational resistance that is haptically perceptible by an operator as a function of machine states or events that are known to the control device or as a function of machine states or events that can be sensed by the control device.

Improved manual operation or control of motion drives or of machine components moved thereby is made possible as a result of the specified measures. In particular, a feedback channel from the control device to the operator is created as a result, wherein system-relevant events or machine states can be communicated reliably and relatively clearly to the operator via the rotary control element, in particular can be perceived haptically by the operator. It is advantageous in this context that the operator of necessity touches, or grips with his fingers, the rotary control element or its actuating element during the generation of control or motion commands, and thus can reliably sense or detect the haptically signaled feedback coming from the control device. Thanks to the inventive measures, in advantageous manner the operator can concentrate primarily on the machine or the manually driven machine components, and the operator does not have to watch possible visual indicators or displays on the human-machine interface any longer, or only relatively seldom.

In addition to an improvement in convenience for the operator, it is possible by means of the measures in accordance with the claims to achieve, first and foremost, a substantial improvement in safety in the operation of machines having motion drives or machine components that are movable under control. In this regard, these safety improvements relate to a lower risk potential with respect to damage to the manually driven machine or its tool and/or workpiece and/or its environment as well as to a lowest possible hazard potential to people in the environment of the machine or to the operator himself. System-critical or system-relevant events can namely be detected especially quickly and clearly by the operator by means of the haptically perceptible signaling via the actuating element of the rotary control element. An operator's ability of tactile perception is even present when it is noisy in the environment of the manually driven machine or machine component, the operator's concentration is focused on other processes, or he is otherwise distracted.

But even when an operator neglects to evaluate possible visual indications at the human-machine interface in a timely manner, or to consider them at all, critical situations can be avoided due to the haptic signaling measures and due to the unmistakable, tactile perceptibility of these signals. The specified control device for machines therefore makes it possible to achieve increased safety, improved convenience of use, and also an operating sequence that is comparatively error-preventive and rapid.

In accordance with a useful embodiment, the analysis and control device and the rotational resistance generating means are equipped to inhibit the rotational mobility of the actuating element, or to subject it to a markedly increased rotational resistance that is haptically perceptible by an operator, when a motion specification provided by an operator by means of the actuating element would cause a transfer or displacement of the driven machine component, for example a machine axis, a tool, a workpiece, or an object to be manipulated, into a structurally or mechanically determined end position, into a prohibited zone, or into a prohibited spatial area. As a result, it is possible to signal to the operator in a timely manner that mechanically or kinematically determined end positions or structurally defined limits that cannot or should not be exceeded are at hand or will be reached soon. Damage or hazards can be reliably prevented in this way. Moreover, operating processes or adjustment processes in connection with machine components that are to be moved manually can be accelerated as a result.

According to an advantageous embodiment, at least one caution zone can be defined in the control device or in the analysis and control device. In the event of control-related detection that the caution zone has been reached, this can be haptically signaled to an operator by driving the rotational resistance generating means. In particular, this can be accomplished or achieved by the creation of ripple marks or an increased actuation resistance or rotational resistance with respect to the actuating element. As a result, operation of machines having motion drives can be significantly improved, in particular simplified or accelerated. Incorrect operation or hazard potentials for people and machines can also be prevented in this way.

The at least one caution zone can be located ahead of a structurally or mechanically determined end position of the machine or machine component, a prohibited zone, or a prohibited spatial area. As a result, an operator can be warned or given advance warning through controlled output of haptic feedback before the prohibited zone is actually reached. Clearly understandable feedback can be composed here of a palpable "rippling" at the actuating element or of an increasing expenditure of force with respect to the actuating element. The operability of machines having manually movable machine components can be improved by this means as well.

The at least one caution zone in this case can be defined by programming in the control device and/or be determined or detectable by sensing means. The same can apply to the additionally or alternatively provided prohibited zone and/or the prohibited area. End positions or end stops of a machine component can also be known to a control device through sensing and/or programming means.

In accordance with a practicable improvement, it is possible to provide that a driving of the rotational resistance generating means is accomplished in such a manner that a rotary motion of the actuating element in a first direction of rotation, which would mean an overrunning of the structurally or mechanically determined end position, or which rotary actuation would result in an encroachment on the prohibited zone or the prohibited spatial area, is inhibited or blocked, and a rotary motion of the actuating element in a second direction of rotation opposite the first direction of rotation is permitted or available. As a result, a rapid, unambiguous, and error-preventive detection and avoidance of the deadlocked state of the machine or of the relevant machine component can be achieved.

According to a useful embodiment, the analysis and control device can be equipped to read out and/or receive and analyze data or signals of the control device of the industrial machine, and the rotational resistance generating means can be influenced in a controlled manner by the analysis and control device based on these data or signals. Corresponding sensing or analysis and control tasks can thus be taken on by the analysis and control device so that the actual machine control system need not be burdened with the additional tasks for implementation of the haptic signaling. Moreover, a relatively problem-free upgrading or retrofitting of existing machine control systems can be achieved as a result.

In accordance with an advantageous implementation, provision can also be made that the analysis and control device and the rotational resistance generating means are equipped to change the rotational resistance or the rotational mobility of the actuating element in correlation with different rates of travel or in connection with the allowable, maximum permissible rates of travel of the machine components. In particular, provision can be made to change or to switch the rotational resistance or the rotational mobility of the actuating element in correlation with different rates of travel, in particular as a function of relevant allowable or permissible rates of travel of the machine components. As a result of this, too, machine-relevant events or states are clearly signaled to the operator and are made intuitively perceptible for the operator so that the operator can react thereto or take countermeasures in a timely manner or at an early point.

In particular, the analysis and control device and the rotational resistance generating means can be equipped to set the rotational resistance of the actuating element low in the event of high rates of travel of the machine components—on condition that these high rates of travel are permissible in each case—and to set the rotational resistance of the actuating element relatively high in the event of relatively low, permissible or advisable rates of travel.

In an advantageous embodiment, the analysis and control device and the rotational resistance generating means can be equipped to sense, in particular to detect, deviations between a target position or target speed desired or specified on the part of the operator and an actual position or actual speed of the driven machine component, for example a machine axis to be moved, and to change, in particular to increase, the rotational resistance of the actuating element when a predefined threshold value for this deviation is reached, or as a function of a size of this deviation. As a result, possible following errors with respect to the motion specification (desired position or target speed) and the motion execution implemented by the machine (actual position or real travel speed) can be counteracted in a timely manner. In particular, a state that can be safety-critical under certain circumstances or a behavior of the machine or machine component that is objectionable to the operator can be prevented in this way. This is especially useful in conjunction with the manual movement of industrial robots, for example for teaching or programming purposes, or in conjunction with the operation of multi-axis, adjustable, or multifunction machines, as for example machine tools or injection molding machines.

It can also be useful when the control device for industrial machines has an operating mode in which a continuously performed rotary actuation of the actuating element is converted into a time-correlated, continuous adjustment movement of the driven machine component. As a result, a precise motion specification and intuitive motion control can be achieved.

According to an advantageous implementation, the specified control device is intended for control of the sequences of an injection molding machine, and is implemented such that a locking or inhibition of the rotational mobility of an actuating element for activation of an ejector unit is brought about when an injection mold of the injection molding machine is in its closed state.

In addition, the specified control device can be intended in advantageous manner for control of the sequences of an industrial robot, and can bring about a locking or inhibition of the rotational mobility of an actuating element, at least in a first direction of rotation, when a manual rotary actuation of this actuating element in the first direction of rotation would cause a transfer of the industrial robot, one of its arms, its TCP, its tool, or its workpiece into a prohibited zone or into a prohibited spatial area.

In accordance with a practicable measure, the analysis and control device and the rotational resistance generating means can be equipped to increase the rotational resistance at the actuating element when a machine component of the driven machine approaches a construction-related or structurally determined end position, or a predefined prohibited zone, or a predefined prohibited spatial area. As a result, corresponding approaches are unmistakably perceptible to the operator. Countermeasures or avoidance measures can be taken by the operator at an early point as a result.

According to a useful implementation, the rotary control element is equipped to sequentially call up or to incrementally follow a programmed sequence of motions, in particular a trajectory stored or represented in the control device, through rotary motions of the actuating element. The analysis and control device and the rotational resistance generating means in this design are equipped to change, in particular to increase and to decrease, the rotational resistance of the actuating element as a function of the rate of travel of the machine or of the relevant driven machine component. As a result, the quality of the machine operation in question can be further improved.

Furthermore, the rotary control element can be equipped to sequentially call up or to follow sequences of a programmed sequence of motions, in particular a programmed sequence of motions already stored in the control device, for example a trajectory, through rotary motions of the actuating element. The analysis and control device and the rotational resistance generating means in this design are equipped to briefly increase the rotational resistance of the actuating element, and thus to create an actuation threshold that can be perceived and overcome by the operator for haptic signaling of a sequence end or of a sequence change. As a result, setup or test runs of machines, in particular of machine tools such as automatic milling machines or automatic lathes, can be carried out conveniently and, at the same time, in a manner that prevents errors.

In addition, the rotary control element can be equipped to call up or to follow a programmed sequence of motions, in particular a sequence of motions already stored in the control device, for example a trajectory, through rotary motions of the actuating element. The analysis and control device and the rotational resistance generating means in this design are equipped to briefly increase the rotational resistance of the actuating element as a function of the activation or deactivation of additional components or additional functions, for example a compressed air nozzle, a coolant supply, a cutting tool, a welding device, or a clamping device, and thus to create an actuation threshold that can be perceived and overcome by the operator for haptic signaling of the activation or deactivation of the additional component or additional function. The testing or modification of an already at least partially created processing program of a machine, in particular of a processing machine or machine tool, or of a sequence program of an industrial robot, can be made easier by this means as well.

The task of the invention is additionally accomplished by the method according to the claims for operating an electronic control device for industrial machines. The advantageous actions and technical effects that can be achieved therewith are found in the above remarks and the portions of the description below.

For better understanding, the invention is explained below in detail on the basis of the following figures, which illustrate possible exemplary embodiments.

Figure 2:
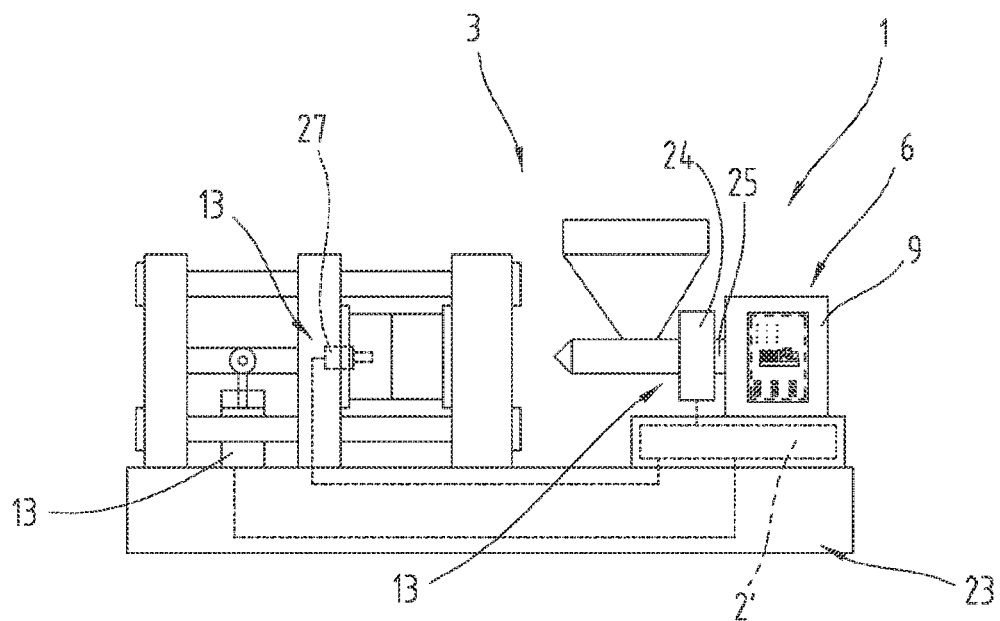
Figure 3:
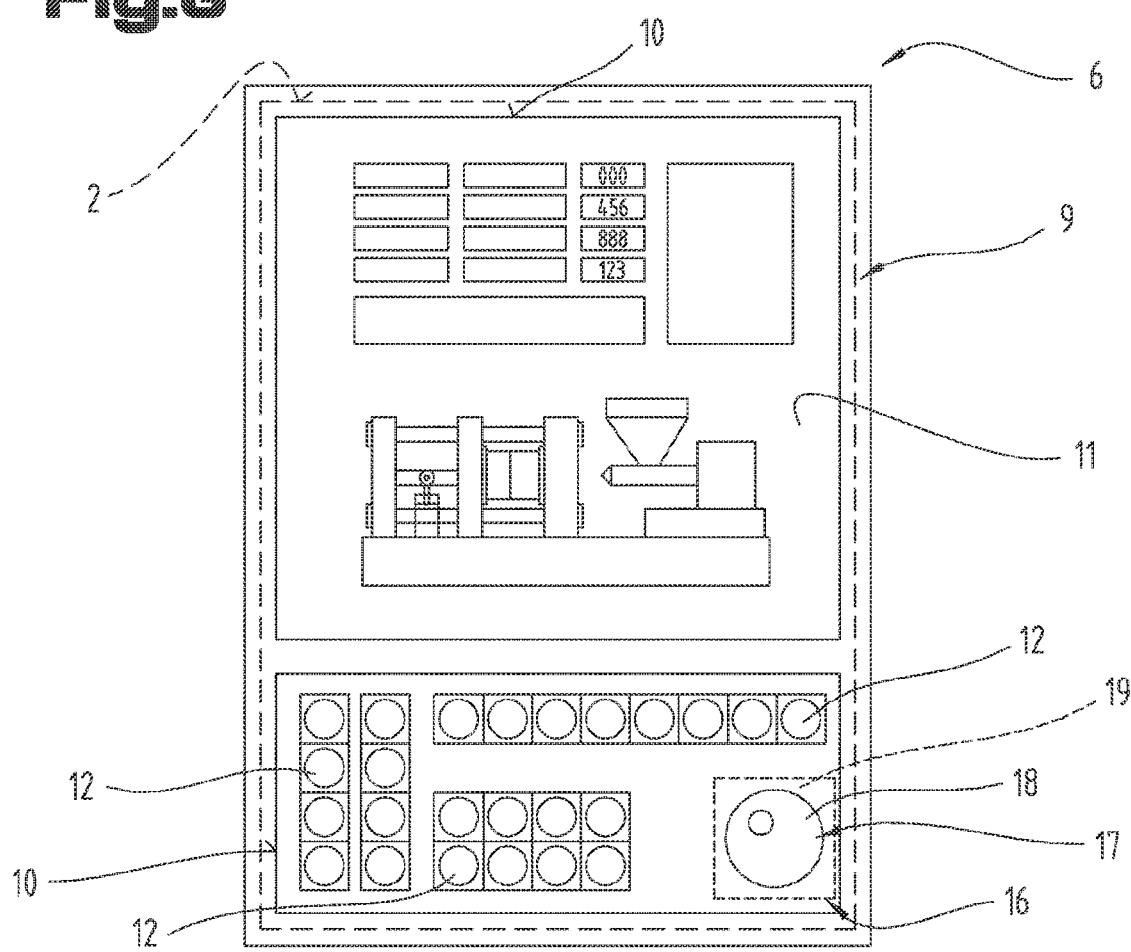

The figures show, in highly simplified, schematic representation:

FIG. 1 a technical facility composed of multiple machines, in particular industrial robots, and an electronic control system employed therewith, which control system comprises multiple control devices and a human-machine interface in the manner of a portable, hand-held controller;

FIG. 2 a production machine, in particular an injection molding machine, that includes an electronic control device and a human-machine interface connected thereto in the manner of a stationary control panel;

FIG. 3 the control panel of the production machine from FIG. 2;

FIG. 4 a control device for industrial machines with a rotary control element that is used for the operation or influencing of motion drives, and in addition is equipped for haptic indication of machine states or events of the control device;

FIG. 5 a rotary control element in connection with the operation of motion drives of an industrial robot;

FIG. 6 a diagram to illustrate a possible operating method of the rotary control element from FIG. 4 or FIG. 5 as a function of the travel speed of machine axes.

As an introduction, it should be stated that the same parts are labeled with the same reference symbols or the same component designations in the different embodiments described, wherein the disclosures contained in the description as a whole can be applied analogously to the same parts having the same reference symbols or the same component designations. Also, the position information chosen in the description, such as top, bottom, lateral, etc., for example, refers to the figure being directly described and shown, and this position information must be transferred analogously to the new position in the event of a change in position.

In FIGS. 1 to 3, exemplary embodiments of electrotechnical or electronic control systems 1 are shown that can be used for the automation or control of industrial facilities. Such an industrial facility or its control system 1 comprises at least one electronic control device 2, 2', or a multiplicity of electronic control devices 2, 2' that are arranged in distributed fashion can also be provided. A corresponding facility comprises at least one machine 3, or a multiplicity of possibly interacting machines 3 or machine components. The at least one electronic control device 2, 2' preferably is software-controlled in design, and serves primarily to implement the relevant control functions of the relevant industrial machine 3 or to be able to monitor, influence, and/or program the sequences of the machine 3.

In accordance with the embodiment from FIG. 1, such an industrial machine 3 is composed of at least one industrial robot 4. Such an industrial robot 4 can be part of an assembly or manufacturing facility. Due to a data networking of the control devices 2, 2' in question, it is possible to provide that the industrial robots 4 can interact in a control-related manner. Such a data-related or control-related networking between multiple industrial robots 4 can also include a central process control computer 5. With regard to a control architecture and networking that are centralized, distributed, hierarchical, or otherwise constructed, an extremely wide variety of embodiments are possible here, which can be chosen in accordance with the applicable requirements.

At least one human-machine interface 6 (HMI) is associated with or can be associated with at least one control device 2' in at least one machine 3 in this design. Control-relevant interactions between an operator 7 and the respective machine 3 are made possible by means of this human-machine interface 6.

In the exemplary embodiment according to FIG. 1, the control-related human-machine interface 6 is composed of a mobile or portable hand-held controller 8. In the embodiment from FIG. 2, the human-machine interface 6 is defined by a stationary control panel 9. The human-machine interfaces 6 in question can thus also be referred to as user interfaces.

A generic hand-held controller 8 or control panel 9 has at least one input device 10, as for example a touch screen 11, input keys 12, switches, or other electrical or electromechanical input means. In addition, visually and/or audibly detectible output means can be provided. In the case of a generic hand-held controller 8 or control panel 9, the previously mentioned touch screen 11, in particular, as well as luminous elements or signaling lamps can be provided for the display of system-relevant data or states. The range of functions and the embodiment of the relevant input device or of the relevant output device depend strongly on the relevant application, in particular on the technical complexity of the machine 3 or facility to be controlled. It is important here that the operator 7 can regulate or monitor, influence, and/or program the required control-related sequences by means of the input device 10 and a suitable output device, in particular by means of the previously mentioned touch screen 11.

The control device 2 implemented in the human-machine interface 6, in particular in the hand-held controller 8 or in the control panel 9, and the control device 2' associated with a machine 3 can be in data-related or control-related interaction through wired and/or wirelessly implemented communication interfaces.

As is known per se, controllable motion drives 13, in particular that can at least be activated and deactivated, are provided for automation of the relevant machines 3, which motion drives are line-connected to the relevant control device 2'. Often such motion drives 13 are also adjustable or variable on demand with respect to their drive speed and/or drive power or driving force. As illustrated in FIG. 4, such motion drives 13 can be composed of motors 14, of solenoid valves 15, or other elements for active or controllable movement of machine components. The corresponding motion drives 13 are also understood to include actuators with which an adjustment movement of a machine component can be produced or initiated. Such a motion drive 13 and the respective machine component can also be referred to as a machine axis in this context. A controllable machine component or machine axis can be understood to include, for example, an articulated arm of an industrial robot 4, a feed unit, a machining unit of a machine tool, a positioner of a production machine, and the like. Typically, a multiplicity of sensors, limit switches, and/or transmitters can also be connected to such a machine control device 2', as has been shown purely by way of example in FIG. 4. As a result, movement or function sequences of the machine in question can be performed fully automatically, or at least partially automatically, or be monitored automatically.

For manual influencing or for programming of the relevant motion drives 13 or machine components, at least one control element 16 is provided at the relevant human-machine interface 6 for manual influencing or specification of adjustment movements of at least one of the machine components or machine axes. This manual influencing or specification of adjustment movements by an operator 7 preferably comprises the possibility of a change in speed and/or power of the motion drive 13 to be driven or that can be selectively driven. In addition, control elements, in particular button elements or switching devices, can be implemented that are provided for activation and deactivation of a selected or drivable motion drive 13.

At least one of the control elements 16 at the human-machine interface 6 in this case is designed as a rotary control element 17 with an actuating element 18 that is continuously rotatable or rotatable without stops. "Continuous rotatability" means here that the rotary control element 17 or its actuating element 18 is designed such that there are no mechanical end stops or no permanent limitation with regard to the rotational mobility of the actuating element 18. This is in contrast to a typical potentiometer or adjustable ohmic resistor, in which a rotation or adjustment range of approximately 270° is normally provided. The rotary control element 17 according to the claims is instead comparable to a so-called override potentiometer, which is to say the rotary control element 17 can be implemented as an incremental encoder that is continuously rotatable. What is important is that the rotary control element 17 permits continuous rotatability of its actuating element 18, for example disk-shaped or wheel-shaped actuating element, or an associated, unlimited output of sensor pulses or increments.

The actuating element 18 here is in mechanical connection or interaction with a rotational resistance generating means 19 that is variable under control. In particular, a mechanical coupling or interaction between the rotational resistance generating means 19 and the actuating element is provided, by which means the rotational mobility of the actuating element can be influenced, in particular can be varied under control. The rotational resistance generating means 19 here can act directly or indirectly on an axis of rotation 20 in the rotary control element 17. The axis of rotation 20 in this case can be provided for rotational support of the actuating element 18.

Alternatively, the actuating element 18 can also be supported on a different axis that is motion-coupled to the axis of rotation 20. Consequently, it is possible to provide that the actuating element is connected in terms of motion or can be connected in terms of motion to a rotational resistance generating means 19 that is variable under control.

In particular, magnetorheologically acting systems, electromagnetically acting systems, or else electromechanically acting braking or locking systems can be employed as a rotational resistance generating means 19. What is important is that a controllable interaction can be created between the rotational resistance generating means 19 and the actuating element 18 in such a manner that an adjustable inhibition and/or locking of the rotational mobility of the actuating element 18 is possible. To this end, the rotational resistance generating means 19, which can be implemented directly in or on the rotary control element 17, is controllable by an electronic analysis and control device 21.

The analysis and control device 21 can have any desired spatial associations in this case. By way of example, it can be associated with the mobile hand-held controller 8 or the control panel 9. It is also possible, however, that this analysis and control device 21 represents a part or a subcomponent of the actual control devices 2' of the respective machines 3 or is implemented by software means in these control devices 2'. It is useful, however, to position the analysis and control device 21 as close in spatial terms as possible to the rotary control element 17 to be driven. In this case, a signaling connection can be implemented between the respective control device 2' and the analysis and control device 21 in order to be able to transmit or exchange the respective relevant data information, as has been schematically indicated in FIG. 4 by a dashed double-headed arrow. The analysis and control device 21 can also be part of the control device 2 of the hand-held controller 8 or the control panel 9, however.

In order to make simple, maximally intuitive and, ultimately, error-preventive as well as fast operation of at least one motion drive 13, in particular of at least one machine axis of the industrial machine 3, possible for an operator 7, provision is made that the analysis and control device 21 and the rotational resistance generating means 19 can inhibit the rotational mobility of the actuating element 18 or subject it to an increased rotational resistance that is haptically perceptible by an operator 7. This controllable, and preferably variable in intensity or action, inhibitability or lockability of the rotational mobility of the actuating element 18 or of the entire rotary control element 17 is accomplished here as a function of machine states or events computationally determined in the control device 2, 2', or stored by programming means, and/or as a function of machine states or events that can be detected by the control device 2, 2' through sensors. The controllable inhibition of the rotational mobility can lead to a blocking or locking of the rotational mobility of the actuating element 18 in this case. As a result, haptic feedback with respect to potential critical events or system-relevant states of the respective driven machine 3 can be communicated to the operator 7 from the control device 2, 2' or indirectly via the analysis and control device 21. Different variants of machine states or machine events for which control-related feedback to the operator 7 can usefully be provided and haptic signaling can be arranged by means of the rotary control element 17 are explained below.

According to a useful embodiment, it is possible to provide that the analysis and control device 21 and the rotational resistance generating means 19 are equipped to inhibit the rotational mobility of the actuating element 18, or to subject it to a markedly increased rotational resistance that is haptically perceptible by an operator 7, when a motion specification provided by an operator 7 by means of the actuating element 18, in particular a corresponding motion control command, would cause an adjustment movement of the driven machine component, for example a machine axis, a tool, a workpiece, or an object to be manipulated, either into a structurally or mechanically determined end position or into a prohibited zone 22, or into a prohibited spatial area. As a result, an encroachment on the prohibited areas or prohibited zones 22, which typically are defined by software or programming means, can be prevented and thus a hazard to people or technical objects can be averted. Especially in conjunction with the manual control or operation of industrial robots 4, a measure of this nature is useful. Irritation of the operator 7, which may give rise to dissatisfaction or undesirable countermeasures, can be prevented in an optimized manner through the haptic feedback via the rotary control element 17. According to a feasible measure, at least one controlled capability to activate or deactivate the rotational resistance generating means 19 is provided.

In accordance with an improvement, it is also possible to provide that the rotational resistance at the actuating element 18 is increased when a machine component of the driven machine 3 or the relevant industrial robot 4 even approaches a construction-related or structurally determined end position, or a predefined prohibited zone 22, or a predefined prohibited spatial area.

The increase in the rotational resistance or of the corresponding holding torque or braking torque with respect to the actuating element 18 can also be accomplished steplessly or continuously, or in stepwise fashion. As a result, it is signaled to the operator 7 early on or in a timely manner that, if the current motion control command is maintained, states or events will soon occur that are impermissible or should be avoided.

By means of the specified measures, therefore, potentially occurring events that require special attention by an operator 7 can be signaled to the operator 7 as promptly as possible and extremely intuitively. Possible oversights or lapses in concentration of an operator 7 that can lead to stoppages or defects at the driven machine 3, or to production delays, can be counteracted in this way.

A rotary control element 17 offers considerable advantages here in comparison to a control element that is adjustable through linear motion, in particular in the manner of a slide control, among other things with regard to robustness, sealability, continuous actuation capability on account of rotatability without stops, simplicity of operation, and the like. However, a rotary control element 17 can also provide many advantages in comparison with a multi-axis joystick or a tiltable control lever.

The rotational resistance generating means 19 can also be used to produce detent steps that can convey to the operator 7, at least haptically, or even haptically and audibly, the angle of rotation traveled in each case by the actuating element 18.

The number of detent steps here that are easy to overcome but are nevertheless perceptible can be strictly predefined or can be automatically adjusted as a function of the respective motion function. Depending on requirements, coarse or fine detent increments can be provided, wherein up to 100 uniformly distributed detent steps per full rotation of the actuating element 18 can easily be perceived tactilely by an operator 7.

The technical measures according to the claims can be employed advantageously in connection with production facilities that comprise at least one industrial robot 4 (FIG. 1), among other situations. Moreover, the specified measures can also be used to advantage in connection with an injection molding machine 23, as has been illustrated by way of example in FIG. 2. As is known per se, such an injection molding machine 23 comprises, among other features, a drive motor 24 for the rotary motion of a plasticizing screw, a hydraulic drive 25 for the axial motion of the screw, and other motion drives that can be activated and deactivated in a controlled manner via the control device 2' of the injection molding machine 23. In addition, such an injection molding machine 23 comprises, as is known per se, an injection mold 26 for forming molded parts to be made of plastic. If necessary, an ejector unit 27, which permits forcible ejection of molded parts created by means of the injection mold 26 via actuation by the control device 2', can be associated with the injection mold 26 here.

Useful applications of the inventive concept are described below. In particular, it can occur in connection with an injection molding machine 23 that a movement of individual machine axes or an activation of machine functions or motion drives is not permitted on account of the current machine status or machine state. For example, the ejector unit 27 of an injection molding machine 23 must not be activated or extended when the injection mold 26 is closed. Otherwise, damage could occur to the components in question. If an operator 7 would like to manually move or activate the ejector unit 27 in such a system state, this is problematic, and according to the invention the rotary control element 17 or the actuating element 18 can be locked or inhibited in its adjustability. Depending on the situation, the rotatability or rotational mobility of the actuating element 18 can be locked in one or both directions of rotation in this case.

According to another embodiment, the application of the inventive measures is especially useful in connection with industrial robots 4. In the field of robotics, prohibited regions or prohibited zones 22 (FIG. 1, 5) typically must not be transgressed or encroached upon by the industrial robot 4, since otherwise damage could occur to the industrial robot 4 or to peripheral components, as for example neighboring machines or robots, conveyor belts, workpieces, and the like, or a danger to people could even arise. If, in this case, the operator 7 were to bring about a manually controlled movement of the industrial robot 4 or of one of its machine components into a prohibited region or into a prohibited zone 22, provision is made that this movement is stopped either by the control device 2, 2' or by the analysis and control device 21, and a continued rotation of the actuating element 18, which is rotatable essentially without stops, of the rotary control element 17 in the corresponding direction of actuation is inhibited or blocked. If the industrial robot 4 in this case does not come to a standstill until after entering the prohibited zone, it is possible to provide that only the particular direction of rotation or rotational direction on the actuating element 18 is enabled or released through which the industrial robot 4 can be moved out of the prohibited zone 22 again, as has been schematically illustrated in FIG. 5. In the normal or initial state, the actuating element 18 can be rotated bidirectionally about its axis of rotation 20.

The analysis and control device 21 can be designed as a separate electronic unit, or else can be implemented in the control device 2 of a machine 3. In particular, the analysis and control device 21 can be implemented primarily through software means. However, a spatially distributed implementation is also possible, in which the corresponding analysis and control functions for implementation of the design according to the invention are distributed between the control device 2, 2' and the rotary control element 17.

In FIG. 6, a useful functionality of the control device 2, 2' or of the analysis and control device 21 is illustrated. In the graphs 28, 29 here, a useful correlation is shown between different rates of travel 30 of a machine component and the rotational resistance M or the rotational mobility 31 of the actuating element 18. Accordingly, it is possible to provide that the analysis and control device 21 or the rotational resistance generating means 19—FIG. 1 to FIG. 4—sets the rotational resistance M of the actuating element 18 low or leaves it low when rates of travel are high, and sets the rotational resistance M comparatively high or higher when rates of travel are comparatively low and permissible in terms of systems engineering.

As a result, intuitive and error-preventive operation is made possible for the operator 7, since a haptic feedback channel is created on the part of the control system 1 or on the part of the respective control device 2, 2'. It is a particular advantage in this regard that the operator 7 only has to focus his gaze or his concentration on the human-machine interface 6 comparatively rarely, and can concentrate more on the actual sequences of motions or sequences of functions of the manually controlled machine 3. In particular, due to the inventive measures it is possible to achieve the result that an operator 7 only comparatively rarely needs to view, in particular evaluate or monitor, the data or states visualized at the human-machine interface 6, for example via the screen 11 or via other visual output means.

The technical measures and method sequences specified above can be implemented through a combination of hardware and software components. The applicant's application for protection is therefore directed to device claims as well as to corresponding method claims.

The exemplary embodiments show possible embodiment variants, wherein it must be noted here that the invention is not restricted to the embodiment variants specifically shown, but rather various combinations of the individual embodiment variants with one another are also possible, and this possibility for variation lies within the ability of a person skilled in the art of this technical field, on the basis of the teaching for technical action provided by the present invention.

The scope of protection is determined by the claims. However, the description and the drawings must be referred to for an interpretation of the claims. Individual characteristics or combinations of characteristics of the different exemplary embodiments that are shown and described can represent independent inventive solutions on their own. The task on which the independent inventive solutions are based can be derived from the description.

As a matter of form, it should be noted in conclusion that, for a better understanding of the structure, some elements were shown not to scale and/or greater in size and/or smaller in size.

REFERENCE SYMBOL LIST 1 control system
2, 2' control device
3 machine
4 industrial robot
5 process control computer
6 human-machine interface
7 operator
8 hand-held controller
9 control panel
10 input device
11 touch screen 12 input key
13 motion drive
14 motor
15 solenoid valve
16 control element
17 rotary control element
18 actuating element
19 rotational resistance generating means
20 axis of rotation
21 analysis and control device
22 prohibited zone
23 injection molding machine
24 drive motor
25 drive
26 injection mold
27 ejector unit
28 graph (v)
29 graph (M)
30 rate of travel
31 rotational mobility

The invention claimed is:

1. A control device for industrial machines having controlled motion drives for machine components, comprising a human-machine interface with at least one control element for manual influencing or specification of adjustment movements of at least one of the machine components,
wherein at least one control element is implemented as a rotary control element with a continuously rotatable actuating element,
wherein the actuating element is connected in terms of motion or can be connected in terms of motion to a rotational resistance generating means that is variable under control, wherein the rotational resistance generating means can be driven by an analysis and control device,
wherein the analysis and control device and the rotational resistance generating means are equipped to inhibit the rotational mobility of the actuating element, or to subject it to an increased rotational resistance that is haptically perceptible by an operator, as a function of machine states or events that are known to the control device or as a function of machine states or events that can be sensed by the control device,
wherein the analysis and control device and the rotational resistance generating means are equipped to change or to switch the rotational resistance or the rotational mobility of the actuating element as a function of relevant allowable or safety-related permissible rates of travel of the machine components, and
wherein the analysis and control device and the rotational resistance generating means are equipped to set the rotational resistance of the actuating element low in the event of high permissible rates of travel of the machine components and to set it relatively high in the event of relatively low, permissible rates of travel.

2. The control device according to claim 1, wherein the analysis and control device and the rotational resistance generating means are equipped to inhibit the rotational mobility of the actuating element, or to subject it to an increased rotational resistance that is haptically perceptible by an operator, when a motion specification provided by an operator by means of the actuating element would cause an adjustment movement of the driven machine component to be manipulated, into a structurally or mechanically determined end position, into a prohibited zone, or into a prohibited spatial area.

3. The control device according to claim 2, wherein the driven machine component is selected from the group consisting of a machine axis, a tool, a workpiece, or an object.

4. The control device according to claim 1, wherein at least one caution zone is defined in the control device or in the analysis and control device, and wherein a reaching of the at least one caution zone is haptically signaled to an operator by driving of the rotational resistance generating means.

5. The control device according to claim 4, wherein the at least one caution zone is located ahead of a structurally or mechanically determined end position, a prohibited zone, or a prohibited spatial area.

6. The control device according to claim 4, wherein the reaching of the at least one caution zone is haptically signaled to an operator by creation of ripple marks or of increased actuation resistance or rotational resistance with respect to the actuating element.

7. The control device according to claim 1, wherein a driving of the rotational resistance generating means is accomplished in such a manner that a rotary motion of the actuating element in a first direction of rotation, which would mean an overrunning of the structurally or mechanically determined end position, or would result in an encroachment on the prohibited zone or the prohibited spatial area, is inhibited or blocked, and a rotary motion of the actuating element in a second direction of rotation opposite the first direction of rotation is permitted or available.

8. The control device according to claim 1, wherein the analysis and control device is equipped to read out and/or receive and analyze data or signals of the control device of the industrial machine, and wherein the rotational resistance generating means is influenced in a controlled manner by the analysis and control device based on these data or signals.

9. The control device according to claim 1, wherein the analysis and control device and the rotational resistance generating means are equipped to sense deviations between a target position or target speed desired or specified on the part of the operator and an actual position or actual speed of the driven machine component, and to change the rotational resistance of the actuating element when a predefined threshold value for this deviation is reached, or as a function of a size of this deviation.

10. The control device according to claim 1, wherein it is equipped to convert a continuously performed rotary actuation of the actuating element into a time-correlated, continuous adjustment movement of the driven machine component.

11. The control device according to claim 1, wherein it is intended for control of the sequences of an injection molding machine, and brings about a locking or inhibition of the rotational mobility of an actuating element for activation of an ejector unit when an injection mold of the injection molding machine is in its closed state.

12. The control device according to claim 1, wherein it is intended for control of the sequences of an industrial robot, and brings about a locking or inhibition of the rotational mobility of the actuating element, at least in a first direction of rotation, when a manual rotary actuation of this actuating element in the first direction of rotation would cause a transfer of the industrial robot, one of its arms, its TCP, its tool, or its workpiece into a prohibited zone or into a prohibited spatial area.

13. The control device according to claim 1, wherein the analysis and control device and the rotational resistance generating means are equipped to increase the rotational resistance at the actuating element when a machine component of the driven machine approaches a structurally determined end position, or a predefined prohibited zone, or a predefined prohibited spatial area.

14. The control device according to claim 1, wherein the rotary control element is equipped to sequentially call up a programmed sequence of motions through rotary motions of the actuating element, and wherein the analysis and control device and the rotational resistance generating means are equipped to change the rotational resistance of the actuating element as a function of the rate of travel of the machine or of the relevant driven machine component.

15. The control device according to claim 1, wherein the rotary control element is equipped to sequentially call up or, respectively, to follow sequences of a programmed sequence of motions stored in the control device through rotary motions of the actuating element, and wherein the analysis and control device and the rotational resistance generating means are equipped to briefly increase the rotational resistance of the actuating element, and thus to create an actuation threshold that can be perceived and overcome by the operator for haptic signaling of a sequence end or of a sequence change.

16. The control device according to claim 1, wherein the rotary control element is equipped to call up or, respectively, to follow a programmed sequence of motions stored in the control device through rotary motions of the actuating element, and wherein the analysis and control device and the rotational resistance generating means are equipped to briefly increase the rotational resistance of the actuating element as a function of the activation or deactivation of additional components or additional functions, and thus to create an actuation threshold that can be perceived and overcome by the operator for haptic signaling of the activation or deactivation of the additional component or additional function.

17. The control device according to claim 1, wherein the analysis and control device and the rotational resistance generating means are equipped to detect deviations between a target position or target speed desired or specified on the part of the operator and an actual position or actual speed of the driven machine component, and to increase the rotational resistance of the actuating element when a predefined threshold value for this deviation is reached, or as a function of a size of this deviation.

18. The control device according to claim 1, wherein the rotary control element is equipped to sequentially call up a programmed trajectory stored in the control device through rotary motions of the actuating element, and wherein the analysis and control device and the rotational resistance generating means are equipped to increase and to decrease the rotational resistance of the actuating element as a function of the rate of travel of the machine or of the relevant driven machine component.

19. The control device according to claim 1, wherein the rotary control element is equipped to sequentially call up or, respectively, to follow sequences of a programmed trajectory stored in the control device through rotary motions of the actuating element, and wherein the analysis and control device and the rotational resistance generating means are equipped to briefly increase the rotational resistance of the actuating element, and thus to create an actuation threshold that can be perceived and overcome by the operator for haptic signaling of a sequence end or of a sequence change.

20. The control device according to claim 1, wherein the rotary control element is equipped to call up or, respectively, to follow a programmed trajectory stored in the control device through rotary motions of the actuating element, and wherein the analysis and control device and the rotational resistance generating means are equipped to briefly increase the rotational resistance of the actuating element as a function of the activation or deactivation of a compressed air nozzle, a coolant supply, a cutting tool, a welding device, or a clamping device and thus to create an actuation threshold that can be perceived and overcome by the operator for haptic signaling of the activation or deactivation of the additional component or additional function.

21. A method for operating an electronic control device for industrial machines having controlled motion drives for machine components,
  wherein a human-machine interface with at least one control element for manual influencing or specification of adjustment movements of at least one of the machine components is provided,
  wherein at least one control element is implemented as a rotary control element with a continuously rotatable actuating element,
  wherein the actuating element is connected in terms of motion or can be connected in terms of motion to a rotational resistance generating means that is variable under control,
  wherein the rotational resistance generating means can be driven by an analysis and control device,
  wherein the rotational mobility of the actuating element is inhibited, or is subjected to an increased rotational resistance that is haptically perceptible by an operator, via the analysis and control device and the rotational resistance generating means as a function of machine states or events that are known to the control device or as a function of machine states or events that can be sensed by the control device,
  wherein the analysis and control device and the rotational resistance generating means are equipped to change or to switch the rotational resistance or the rotational mobility of the actuating element as a function of relevant allowable or safety-related permissible rates of travel of the machine components, and
  wherein the analysis and control device and the rotational resistance generating means are equipped to set the rotational resistance of the actuating element low in the event of high permissible rates of travel of the machine components and to set it relatively high in the event of relatively low, permissible rates of travel.

* * * * *